(12) United States Patent
Matsuki

(10) Patent No.: US 7,808,153 B2
(45) Date of Patent: Oct. 5, 2010

(54) INERTIAL DRIVE ACTUATOR

(75) Inventor: Kaoru Matsuki, Tokyo (JP)

(73) Assignee: Olympus Corporation, Tokyo (JP)

( * ) Notice: Subject to any disclaimer, the term of this patent is extended or adjusted under 35 U.S.C. 154(b) by 83 days.

(21) Appl. No.: 12/355,029

(22) Filed: Jan. 16, 2009

(65) Prior Publication Data

US 2009/0189486 A1    Jul. 30, 2009

(30) Foreign Application Priority Data

Jan. 25, 2008    (JP)    .............................. 2008-014923

(51) Int. Cl.
*H01L 41/08* (2006.01)
(52) U.S. Cl. ................................. 310/323.02
(58) Field of Classification Search ............ 310/323.02, 310/328
See application file for complete search history.

(56) References Cited

U.S. PATENT DOCUMENTS

| | | | |
|---|---|---|---|
| 5,589,723 A * | 12/1996 | Yoshida et al. .............. | 310/328 |
| 6,803,699 B2 * | 10/2004 | Yuasa et al. ................. | 310/317 |
| 6,841,899 B2 * | 1/2005 | Kaneko .................... | 310/12.31 |
| 7,348,693 B2 * | 3/2008 | Sasaki et al. ........... | 310/323.02 |
| 7,449,802 B2 * | 11/2008 | Sasaki et al. ........... | 310/323.02 |
| 7,550,896 B1 * | 6/2009 | Su ......................... | 310/316.02 |
| 7,608,979 B2 * | 10/2009 | Sato et al. .................... | 310/317 |

* cited by examiner

*Primary Examiner*—Mark Budd
(74) *Attorney, Agent, or Firm*—Scully, Scott, Murphy & Presser, P.C.

(57) ABSTRACT

An inertial drive actuator includes a fixed member, a vibration substrate which is disposed on the fixed member, a displacement generating unit which causes a reciprocating movement of the vibration substrate with respect to the fixed member, a moving body which is disposed on the vibration substrate, and which is made of a magnetic body which moves with respect to the vibration substrate due to inertia with respect to the reciprocating movement of the vibration substrate, a coil which is provided on the moving body, and a driving unit which applies a voltage for causing a reciprocating movement of the moving body, and which controls a frictional force generated between the vibration substrate and the moving body by making an electromagnetic force act by applying an electric current to the coil.

21 Claims, 13 Drawing Sheets

APPLIED WAVEFORM TO PIEZOELECTRIC ELEMENT 2

APPLIED WAVEFORM TO COIL 5

A   B   C

APPLIED WAVEFORM TO PIEZOELECTRIC ELEMENT 2

APPLIED WAVEFORM TO COIL 5

A      B      C

APPLIED WAVEFORM TO
PIEZOELECTRIC ELEMENT 2

APPLIED WAVEFORM TO
COIL 52

APPLIED WAVEFORM TO
COIL 53

APPLIED WAVEFORM TO PIEZOELECTRIC ELEMENT 2

APPLIED WAVEFORM TO COIL 52

APPLIED WAVEFORM TO COIL 53

INERTIAL DRIVE ACTUATOR

CROSS-REFERENCE TO RELATED APPLICATION

The present application is based upon and claims the benefit of priority from the prior Japanese Patent Application No. 2008-014293 filed on Jan. 25, 2008, the entire contents of which are incorporated herein by reference.

BACKGROUND OF THE INVENTION

1. Field of the Invention

The present invention relates to an inertial drive actuator which moves a moving member is a predetermined direction by a frictional force between a driving member and the moving member.

2. Description of the Related Art

A conventional inertial drive actuator will be described below.

A drive pulse of a waveform formed of a gently rising part and a rapidly falling part is applied to an electromechanical transducer such as a piezoelectric element. At this time, at the gently rising part of the drive pulse, the piezoelectric element is displaced by being extended gently in a direction of thickness, and at the rapidly falling part, the piezoelectric element is displaced by being contracted rapidly. Given this, by using this characteristic, by applying a drive pulse of a waveform as mentioned above to the piezoelectric element, discharge and charge are repeated at different speeds, and vibrations are generated in a direction of thickness in the piezoelectric element, at different speeds in the piezoelectric element. A driving member fixed to the piezoelectric element is let to make a reciprocating movement at different velocities, and a moving member which is attached to the driving member is moved in a predetermined direction. In an inertial drive actuator, the moving member is carried in a predetermined direction by using a frictional force between the driving member and the moving member.

In FIG. 13, a structure related to a driving member 13 and a moving member 14 of the conventional inertial drive actuator is shown. The conventional inertial drive actuator acquires a frictional force by the moving member 14 being pressed by the driving member (drive shaft) 13. A method in which a plate spring is used has been widely used as a method for acquiring the frictional force. However, here, the frictional force is imparted by inserting a pinching member 15, and pressing the pinching member 15 from above by an elastic member 16. The pinching member 15 is fitted tightly to the moving member 14 in a direction of movement of the driving member 13. Accordingly, a thrust generated by the elastic member 16 is transmitted to the driving member 13 via the pinching member 15 which is not displaced with respect to the moving member 14. Moreover, even when the driving member 13 changes at a different velocity (speed) in a positive direction and a negative direction in an axial direction, the elastic member 16 does not undergo an elastic deformation. Accordingly, it is possible to drive the moving member 14 stably at a high velocity.

For example, a conventional structure is disclosed in U.S. Pat. No. 5,589,723.

However, in the conventional structure in which, the pinching member 15 is pressed by the elastic member 16, since each component becomes large, it is not favorable for making a size small. Moreover, the pinching member 15 is in contact with the driving member 13 all the time, and generates friction, and moves relatively on the driving member 13. Therefore, when it is moved continuously for a long time, due to a wearing out between the pinching member 15 and the driving member 13, the driving member 13 or the pinching member 15 are worn down. Due to the wearing down of the driving member 13 and the pinching member 15, the thrust exerted by the elastic member 16 can not be transmitted accurately to the moving member 14. As a result, there occurs a defect such as a difficulty in driving the moving member 14 sufficiently. When the wearing out increases further, there is a possibility that a problem in which the operation becomes impossible arises.

SUMMARY OF THE INVENTION

The present invention is made in view of the abovementioned circumstances, and an object of the present invention is to provide an inertial drive actuator in which there is no decline in a driving speed and a position control even when used for a long time, by making a structure such that a stable frictional force is generated between the moving member and the driving member.

To solve the abovementioned problems and to achieve the object, according to the present invention, there is provided an inertial drive actuator including a fixed member, a displacement generating unit of which, one end is fixed to the fixed member, and the other end reciprocates, a vibration substrate which is connected to the displacement generating unit, and which reciprocates with respect to the fixed member along with the reciprocating movement of the displacement generating unit, a moving body which is disposed on the vibration substrate, and which is made of a magnetic body which moves with respect to the vibration substrate due to inertia with respect to the reciprocating movement of the vibration substrate, a coil which is provided on the moving body, and a driving unit which applies a voltage for causing a reciprocating movement of the displacement generating unit, and which applies an electric current for controlling a frictional force which is generated between the vibration substrate and the moving body due to making act an electromagnetic force by applying an electric current to the coil.

According to a preferable aspect of the present invention, it is desirable that both a velocity on a way and a velocity on a way back of the reciprocating movement of the displacement generating unit are equal.

According to another preferable aspect of the present invention, it is desirable that at least one adsorbing portion is formed on the moving body, and that a frictional force due to a magnetic adsorption force which is caused by an electromagnetic force is generated between the adsorbing portion and the vibration substrate.

According to still another preferable aspect of the present invention, it is desirable that an area of a surface of the adsorbing portion facing the vibration substrate is more than a cross-sectional area in a radial direction of the coil, and that a width of the adsorbing portion is at least same as a width of the vibration substrate, or is smaller than the width of the vibration substrate.

According to still another preferable aspect of the present invention, it is desirable that the inertial drive actuator includes a plurality of moving bodies on which the coil is formed, and that the driving unit changes independently the magnetic adsorption force between the vibration substrate and the plurality of moving bodies by applying an electric current independently to the coils of the plurality of moving bodies.

According to still another preferable aspect of the present invention, it is desirable that an optical element is installed further on the moving body via a coupling member.

According to still another preferable aspect of the present invention, it is desirable that two adsorbing portions are formed to be aligned in a direction in which the moving body moves, and that the coil is positioned between the two adsorbing portions, and an axis of the coil coincides with a direction of movement of the moving body.

According to still another preferable aspect of the present invention, it is desirable that a protrusion for forming the coil is formed on the adsorbing portion, in a direction perpendicular to a surface facing the vibration substrate.

According to still another preferable aspect of the present invention, it is desirable that the protrusion also serves as the coupling member.

According to still another preferable aspect of the present invention, it is desirable that at least one of the vibration substrate and the fixed member is made of a magnetic body.

According to still another preferable aspect of the present invention, it is desirable that a permanent magnet is disposed on a surface of the fixed member not facing the moving body.

According to still another preferable aspect of the present invention, it is desirable that a guide which is made of an insulating body for regulating a direction of movement of the moving body and a movement in a direction perpendicular is formed on the fixed member.

According to still another preferable aspect of the present invention, it is desirable that a guide for regulating a direction of movement of the moving body and a movement in a direction perpendicular is formed on the vibration substrate.

DETAILED DESCRIPTION OF THE INVENTION

Exemplary embodiments of an inertial drive actuator according to the present invention will be described below in detail by referring to the accompanying diagrams. However, the present invention is not restricted to the embodiments described below.

Figure 1:
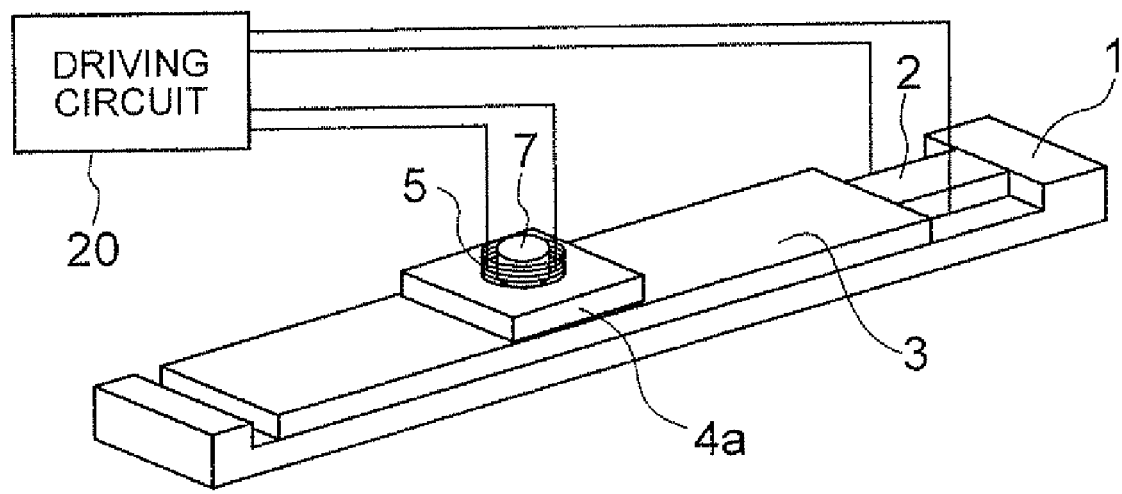
FIG. 1 is a diagram showing a structure of a first embodiment.

FIG. 1 is a diagram showing a structure of a first embodiment of an inertial drive actuator according to the present invention. The first embodiment of the present invention will be described below while referring to the accompanying diagrams.

In FIG. 1, one end of a piezoelectric element 2 is fixed to a fixed member 1, and the other end thereof is fixed to one end of a vibration substrate 3. A moving body 4 which is movable in a direction of vibration (oscillation) of the piezoelectric element 2 is disposed on the vibration substrate 3. The moving body 4 is formed by an adsorbing portion 4a, a coil 5, and a protrusion 7. The protrusion 7 is provided on an opposite side of a surface facing the vibration substrate 3, of the adsorbing portion 4a. Moreover, the coil 5 is formed on the projection 7.

A driving circuit 20 is connected to each of the piezoelectric element 2 and the coil 5. The piezoelectric element 2 corresponds to a displacement generating means (unit) according to the present invention.

Here, a fixed substrate 1 or the vibration substrate 3 is made of a magnetic body (such as iron, and magnetic stainless steel), and the adsorbing portion 4a is also a magnetic body. A bottom surface of the adsorbing body 4a is in a contact with the vibration substrate 3, and when an electric current is applied to the coil 5, a magnetic field is generated. The magnetic field generated passes through the moving body 4 which is a magnetic body, and a magnetic field is generated also in the adsorbing portion 4a. Due to the magnetic field generated in the adsorbing portion 4a, a magnetic adsorption force is generated with respect to the fixed member 1 or the vibration substrate 3 which is a magnetic body, and the moving body 4 and the vibration substrate 3 make a close contact, and a frictional force is generated between the two.

Figure 2A:
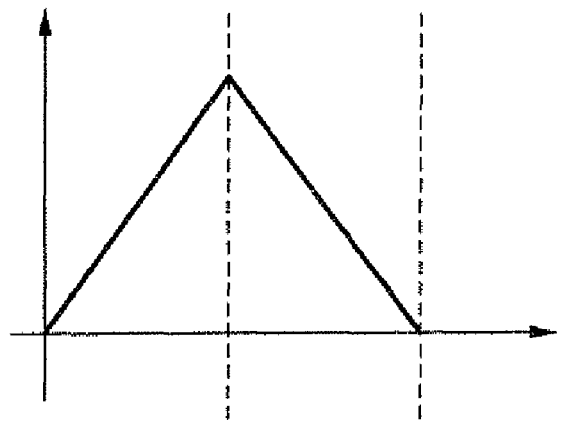
FIG. 2A and FIG. 2B are diagrams describing driving waveforms of the first embodiment.
Figure 2B:
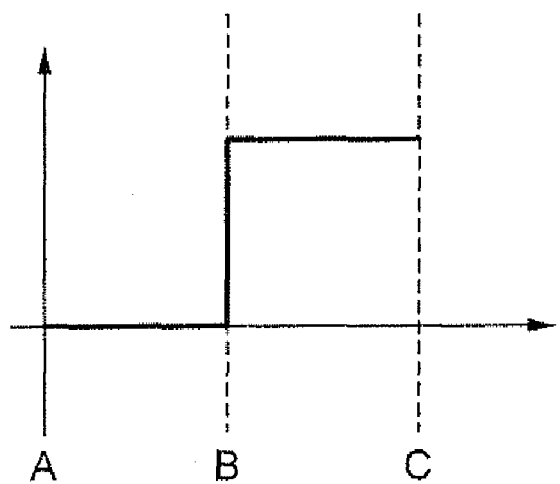
Figure 3A:
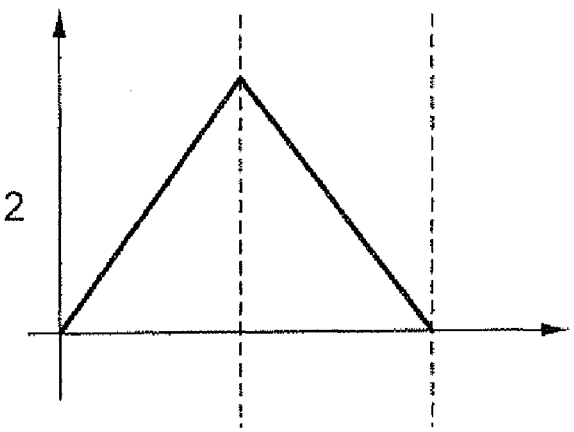
FIG. 3A and FIG. 3B are other diagrams describing driving waveforms of the first embodiment.
Figure 3B:
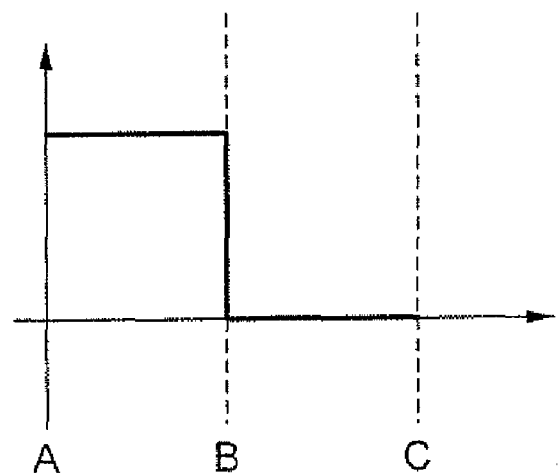

Driving waveforms of the inertial drive actuator are shown in FIG. 2A, FIG. 2B, FIG. 3A, and FIG. 3B. FIG. 2A and FIG. 2B are waveforms when the moving body 4 is moved to right. FIG. 3A and FIG. 3B are waveforms when the moving body 4 is moved to left. A driving principle will be described below by using FIG. 2A, FIG. 2B, FIG. 3A, and FIG. 3B.

At a portion where a waveform applied to the piezoelectric element 2 rises steeply, the piezoelectric element 2 is extended to be displaced, and is rapidly displaced to left. With the displacement of the piezoelectric element 2, the vibration substrate 3 is also rapidly displaced to left.

As shown in FIG. 3A and FIG. 3B, while the waveform applied to the piezoelectric element 2 rises up, an electric current is applied to the coil 5. Due to the electric current, a magnetic adsorption force is generated between the vibration substrate 2 and the adsorbing portion 4a of the moving body 4, and there is a friction. Consequently, the moving body 4 also moves to left along with the movement of the vibration substrate 3.

Conversely, at a portion where the waveform applied to the piezoelectric element 2 falls, the piezoelectric element 2 is contracted to be displaced, and the vibration substrate 3 is displaced to right. During this time, the electric current to the coil 5 is stopped. At this time, there is no electromagnetic force between the moving body 4 and the vibration substrate 3, and an adsorption force, or in other words, the frictional force does not act. Therefore, when the vibration substrate 3 moves to right, the moving body 4 slips with respect to the vibration substrate 3, and at the same time, remains at that position due to a force of inertia. By repeating this, the moving body 4 moves to left with respect to the vibration substrate 3.

In a case of moving the moving body 4 to right, as shown in FIG. 2A and FIG. 2B, at the time of falling of a voltage, in other words, when the piezoelectric element 2 contracts rapidly, an electric field is to be generated by passing the electric current through the coil 5. The basic driving principle of the inertial drive actuator is as described above.

The friction being imparted by the magnetic absorption force by allowing to synchronize with the piezoelectric vibrations, since the moving body moves only when the friction has increased, a driving efficiency is improved. Further, since the frictional force is controlled by the magnetic adsorption force generated by the electric current applied to the coil 5, it does not change due to wearing out. Consequently, a stable operation is possible even when used for a long time.

Moreover, in a conventional actuator, since a force imparted by an elastic member is used for generating the frictional force, a complicated waveform is necessary for a control of the displacement. In the first embodiment, since the control is carried out by the magnetic adsorption force, as shown in FIG. 2A, FIG. 2B, FIG. 3A, and FIG. 3B, it is possible to carry out an inertial drive at a same speed of displacement of the piezoelectric element 2 for both the way and the way back. Consequently, a complicated waveform is not to be created at the time of operating the piezoelectric element 2.

SECOND EMBODIMENT

Figure 4:
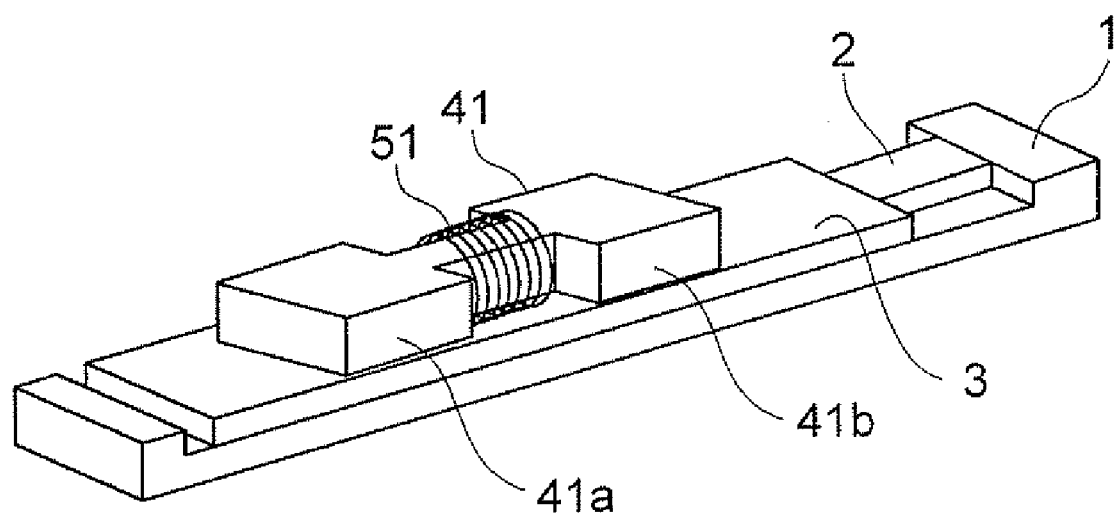
FIG. 4 is a diagram showing a structure of a second embodiment.

A second embodiment of the present invention is shown in FIG. 4. In the second embodiment, two adsorbing portions namely a first adsorbing portion 41a and a second adsorbing portion 41b are formed on a moving body 41. A coil 51 having an axis in a direction of movement of the moving body 41 is formed between the first adsorbing portion 41a and the second adsorbing portion 41b. When an electric current is applied to the coil 5, an electric field generated in the coil 51 is generated in the two adsorbing portions namely the first adsorbing portion 41a and the second adsorbing portion 41b. Since the magnetic adsorption force is acquired in the first adsorbing portion 41a and the second adsorbing portion 41b, even stronger magnetic adsorption force is acquired.

In the second embodiment, by letting the axis of the coil 51 to be in a direction same as the direction of movement of the moving body 41, and providing two adsorbing portions namely the first adsorbing portion 41a and the second adsorbing portion 41b as an adsorbing portion with the vibration substrate 3, adsorption force sufficient for acquiring the frictional force even upon making small a size is achieved. Moreover, by making a cross-sectional area of the coil 51 smaller than an area of the first adsorbing portion 41a and the second adsorbing portion 41b, and making a width (length in a direction perpendicular to the direction of movement) of the first adsorbing portion 41a and the second adsorbing portion 41b same as a width of the vibration substrate, the actuator is made small.

THIRD EMBODIMENT

Figure 5:
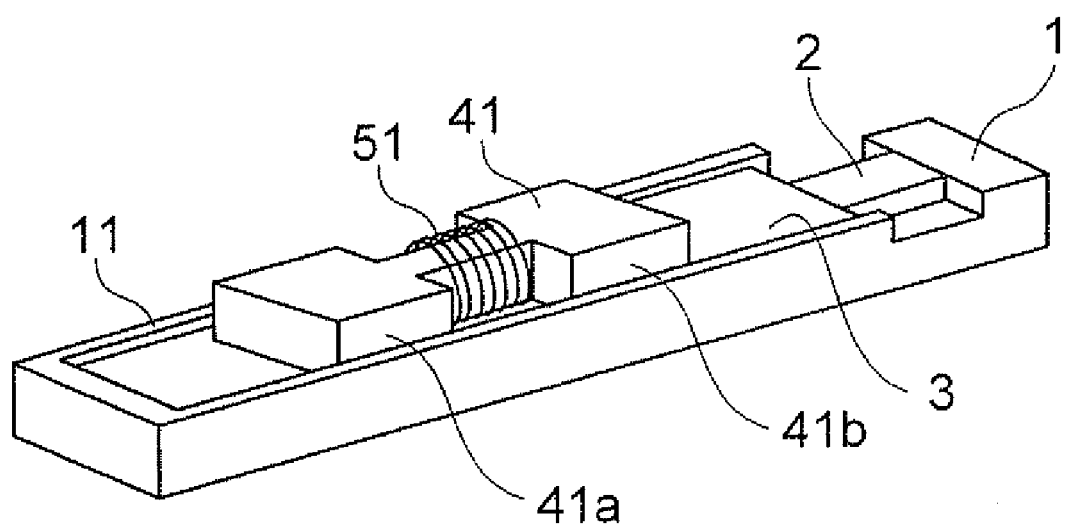
FIG. 5 is a diagram showing a structure of a third embodiment.

FIG. 5 shows a third embodiment of the present invention. A guide 11 for regulating a movement in a direction perpendicular to the direction of movement of the moving body 41 is provided to the fixed member 1. By providing the guide 11, it is possible to let the direction of movement of the moving body 41 coincide with a direction of vibration of the piezoelectric element 2, or in other words, with a direction of vibration of the vibration substrate 3. Further, by letting a material of the guide 11 and the fixed member 1 to be an insulating body, and letting the vibration substrate 3 to be a magnetic body, the magnetic adsorption force due to the magnetic field is generated only in the first adsorbing portion 41a, the second adsorbing portion 41b, and the vibration substrate 3, without having an effect of a magnetic field generated by the guide 11.

Figure 6:
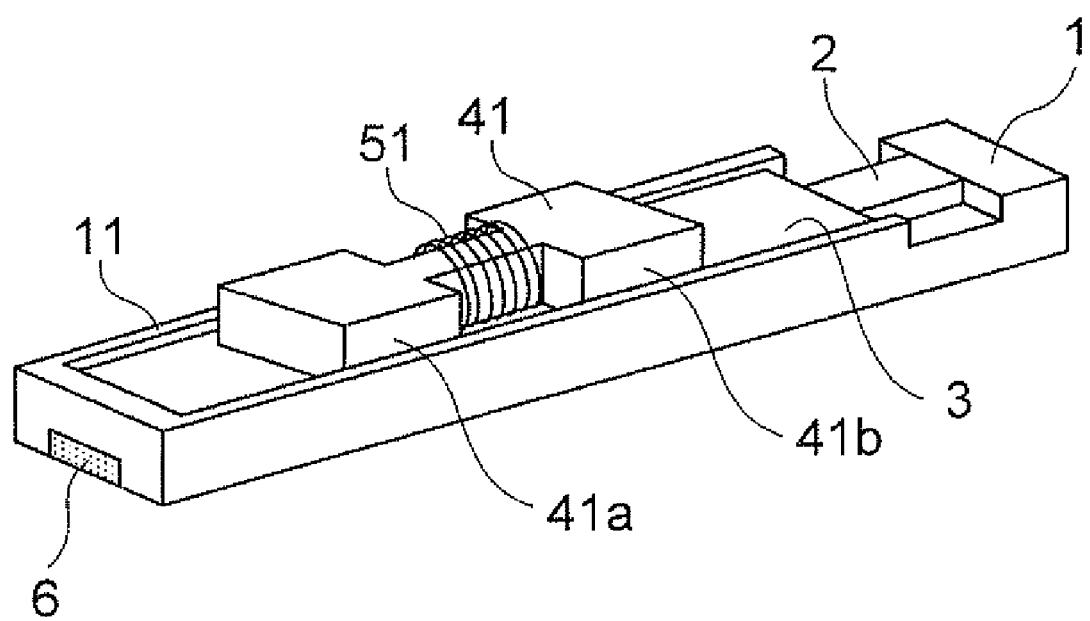
FIG. 6 is a diagram showing a structure of a modified embodiment of the third embodiment.
Figure 7:
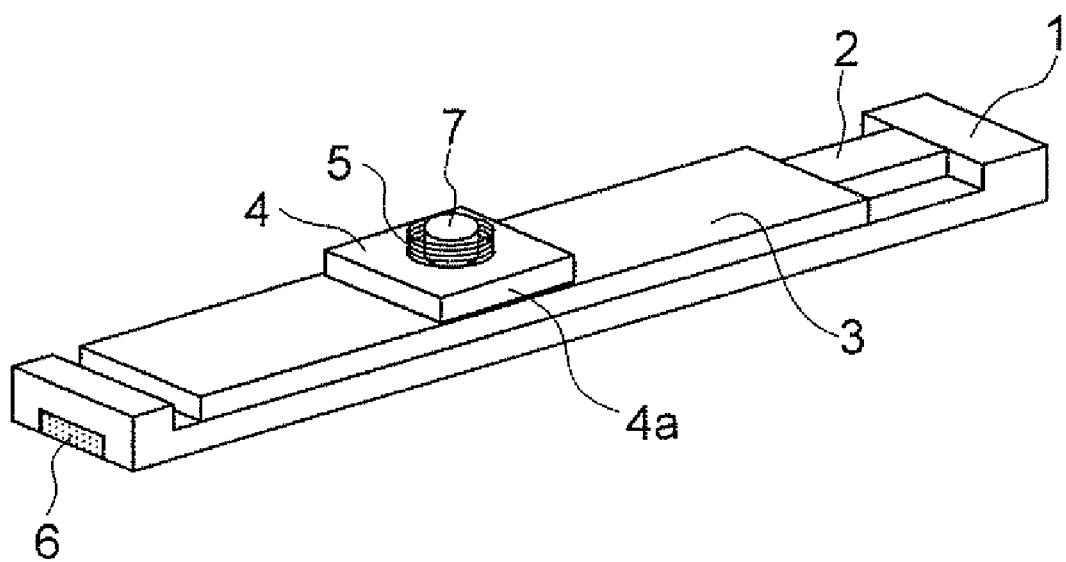
FIG. 7 is a diagram showing a structure of a modified embodiment of an embodiment.

Further, as shown in FIG. 6 and FIG. 7, a permanent magnet 6 may be provided on the fixed member 1 at a position facing the vibration substrate 3. By making an arrangement in such manner, it is possible to hold the moving bodies 4 and 41 at the respective positions by the magnetic field of the permanent magnet 6 even when the electric power is passed through the coils 5 and 51.

Figure 8:
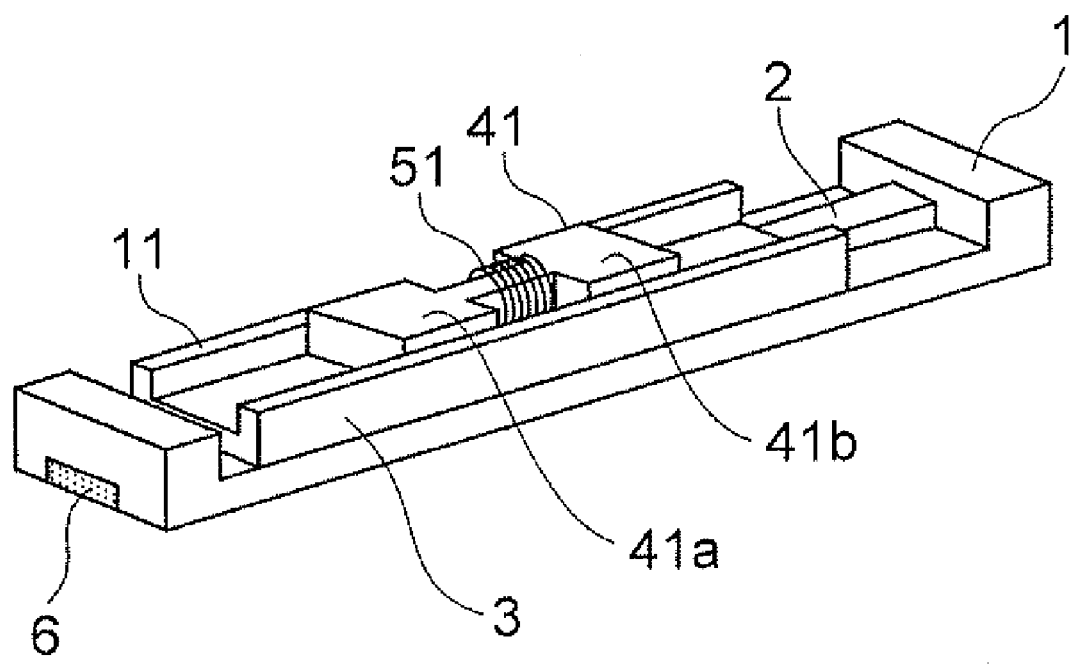
FIG. 8 is a diagram showing a structure of a modified embodiment of the third embodiment.

FIG. 8 is a diagram in which a modified embodiment of the third embodiment is shown. The guide 11 is not provided to the fixed member 1 but to the vibration substrate 3. By letting the vibration substrate 3 to be a magnetic body, a magnetic field generated in the adsorbing portion 41 is generated not only on a surface facing the vibration substrate 3 but also in the guide 11, and a magnetic adsorption is developed. Therefore, it is possible to increase an area of magnetic adsorption, and a stable driving is possible even when a size of the actuator is made small.

FOURTH EMBODIMENT

Figure 9:
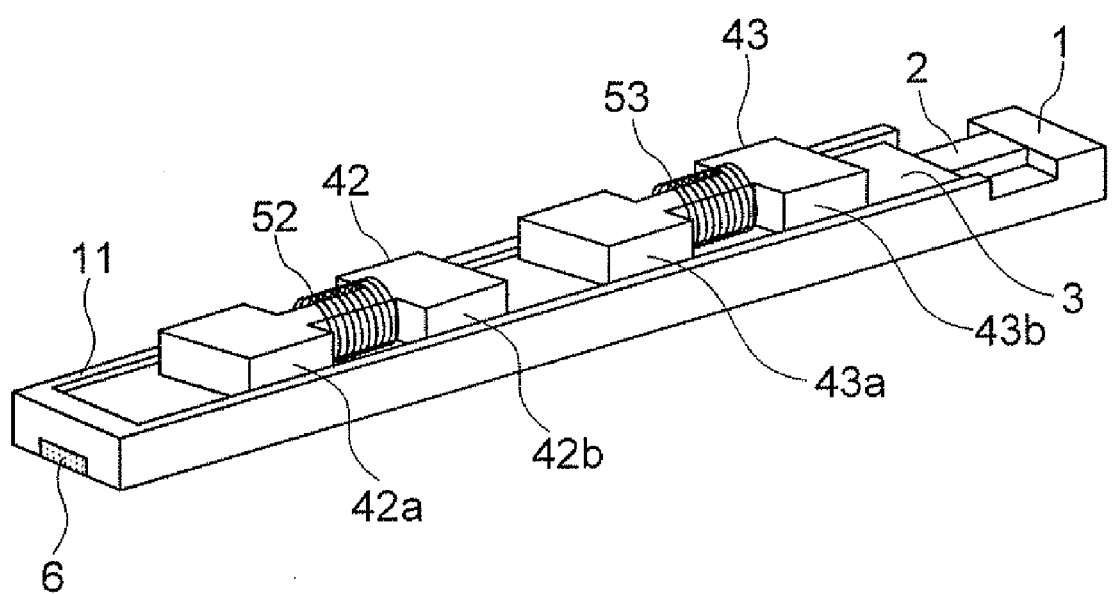
FIG. 9 is a diagram showing a structure of a fourth embodiment.
Figure 10A:
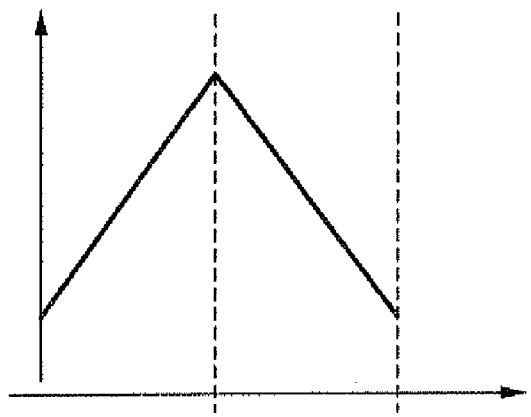
FIG. 10A, FIG. 10B, and FIG. 10C are diagrams describing driving waveforms of the fourth embodiment.
Figure 10B:
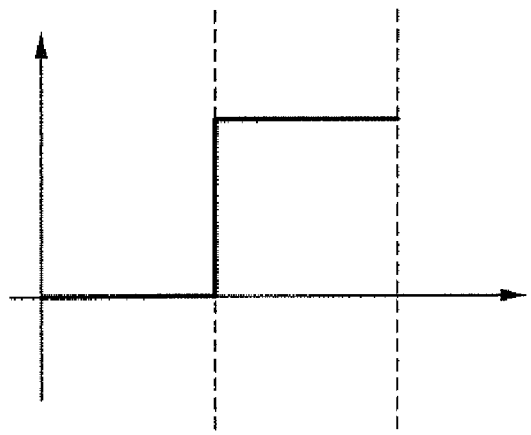
Figure 10C:
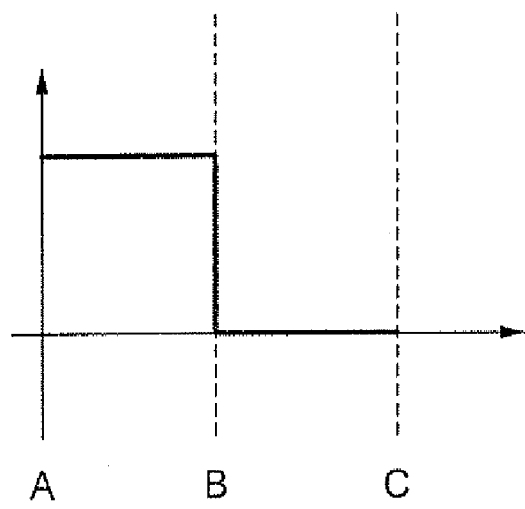
Figure 11A:
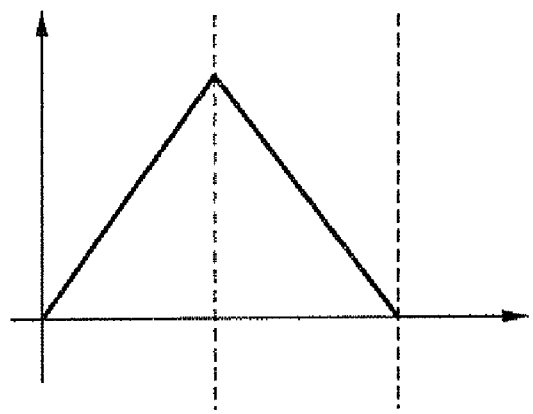
FIG. 11A, FIG. 11B, and FIG. 11C are diagrams describing a structure of the driving waveforms of the fourth embodiment.
Figure 11B:
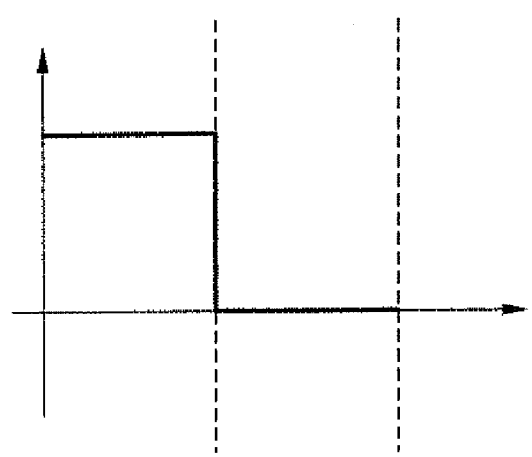
Figure 11C:
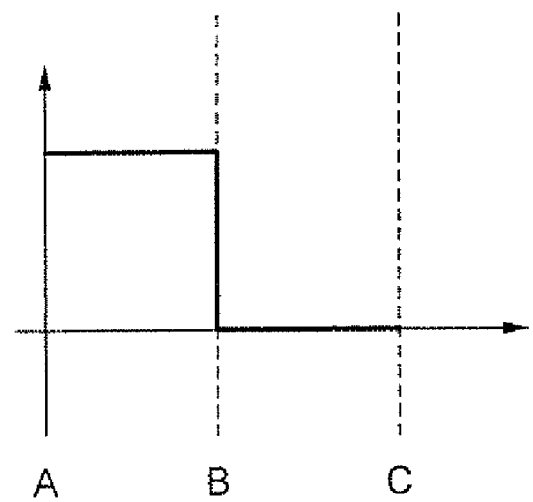

A structure of a fourth embodiment of the present invention is shown in FIG. 9. Driving waveforms of the fourth embodiment are shown in FIG. 10A, FIG. 10B, FIG. 10C, FIG. 11A, FIG. 11B, and FIG. 11C. In the fourth embodiment, two moving bodies 42 and 43 are disposed to be separated on the vibration substrate 3. As the driving waveforms shown in FIG. 10A, FIG. 10B, and FIG. 10C, matching with a time of applying a voltage to the piezoelectric element 2, an electric current is applied each of a coil 52 and a coil 53 at different timings. By making such an arrangement, it is possible to move one moving body to right and the other moving body to left. Since the timing of applying the electric current to the coils 52 and 53 is let to be the same in FIG. 11A, FIG. 11B, and FIG. 11C, the two moving bodies 42 and 43 move in the same direction. In this manner, only by changing the timing of the current applied to the coils 52 and 53 of the moving bodies 42 and 43 in one piezoelectric element 2 and the vibration substrate 3, it is possible to move the two moving bodies 42 and 43 in separate directions or in the same direction without increasing a size of the actuator, mainly in the direction perpendicular to the direction of movement.

FIFTH EMBODIMENT

Figure 12A:
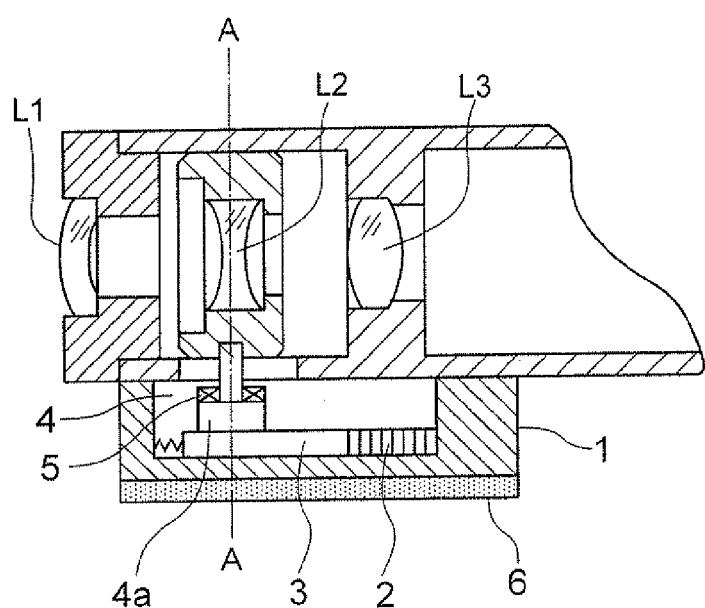
FIG. 12A and FIG. 12B are diagrams showing a structure of a fifth embodiment.
Figure 12B:
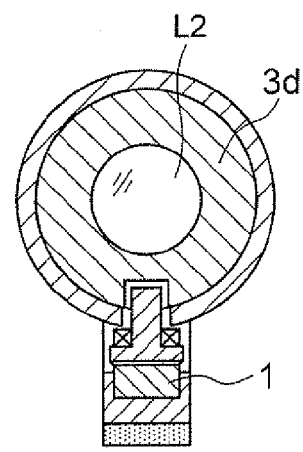
Figure 13:
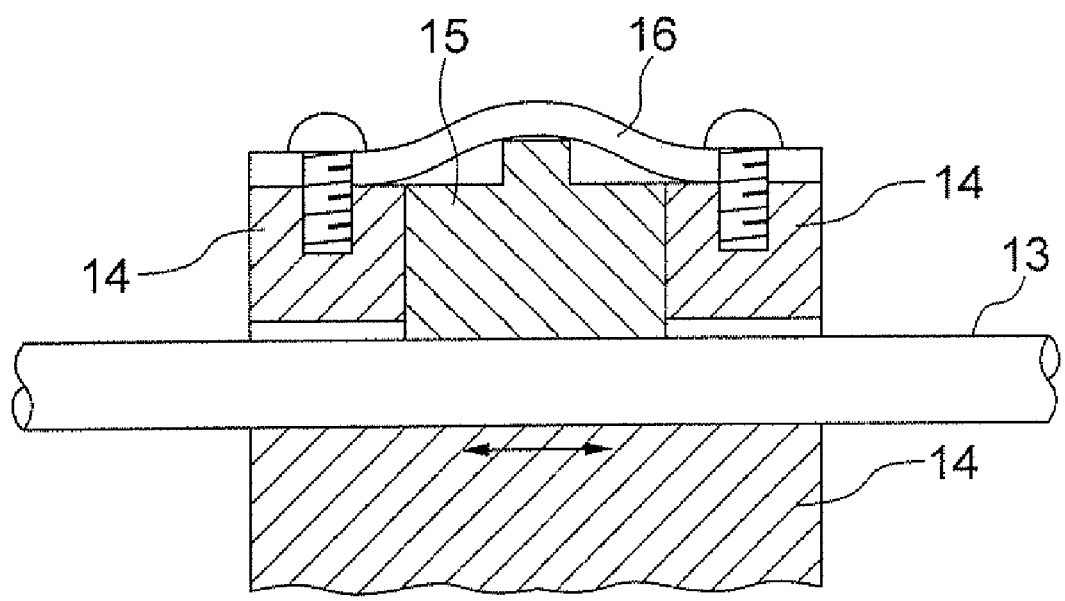
FIG. 13 is a diagram showing a conventional structure.

FIG. 12A shows a structure of a fifth embodiment of the present invention and FIG. 12B shows a cross-sectional view thereof along a line A-A. In the fifth embodiment, a lens L2 is coupled with the moving body 4, and the lens L2 coupled with the moving body 4 is moved. An optical system is formed by a lens L1 and a lens L3 which are fixed, apart from the lens L2, and further, by disposing an image pickup element (not shown in the diagram) toward the lens L3, it is possible to build an optical apparatus. In the fifth embodiment, it is one combination of the moving body 4 and the lens. However, by increasing the combinations of the moving body 4 and the lens, it possible to realize a zoom and an auto focus etc. by driving multiple groups of lenses. Moreover, by sharing of a coupled portion with a lens by a protrusion which forms the coil 5 as shown in FIG. 12A and FIG. 12B, it is also possible to make small a lens driving system.

As it has been described above, the inertial drive actuator according to the present invention is useful as an inertial drive actuator which moves a moving member in a predetermined direction by a frictional force between a driving member and the moving member, and is particularly suitable for an inertial drive actuator which necessitates a stable driving velocity (speed) and a position control even when continued to be used for a long time.

Since the inertial drive actuator according to the present invention acquires the frictional force necessary for the movement by a magnetic adsorption force, even when used for a long time, there is no decline in the frictional force due to the wearing out of a vibration substrate and an adsorbing portion. Consequently, since there is no decline in the driving velocity and the position control due to the wearing out, even when it is continued to be moved for a long time, an effect is shown that it is possible to drive the moving member with sufficient stability.

What is claimed is:

1. An inertial drive actuator comprising:
   a fixed member;
   a displacement generating unit of which, one end is fixed to the fixed member, and the other end reciprocates;
   a vibration substrate which is connected to the displacement generating unit, and which reciprocates with respect to the fixed member along with the reciprocating movement of the displacement generating unit;
   a moving body which is disposed on the vibration substrate, and which is made of a magnetic body which moves with respect to the vibration substrate due to inertia with respect to the reciprocating movement of the vibration substrate;
   a coil which is provided on the moving body; and
   a driving unit which applies a voltage for causing a reciprocating movement of the displacement generating unit, and which applies an electric current for controlling a frictional force which is generated between the vibration substrate and the moving body due to making act an electromagnetic force by applying an electric current to the coil.

2. The inertial drive actuator according to claim 1, wherein both a velocity on a way and a velocity on a way back of the reciprocating movement of the displacement generating unit are equal.

3. The inertial drive actuator according to claim 2, wherein
   at least one adsorbing portion is formed on the moving body, and
   a frictional force due to a magnetic adsorption force which is caused by an electromagnetic force is generated between the adsorbing portion and the vibration substrate.

4. The inertial drive actuator according to claim 3, wherein
   an area of a surface of the adsorbing portion which is facing the vibration substrate is more than a cross-sectional area in a radial direction of the coil, and
   a width of the adsorbing portion is at least same as a width of the vibration substrate, or is smaller than the width of the vibration substrate.

5. The inertial drive actuator according to claim 4, comprising:
   a plurality of moving bodies on which the coil is formed, wherein
   the driving unit changes independently the magnetic adsorption force between the vibration substrate and the plurality of moving bodies by applying an electric current independently to the coils of the plurality of moving bodies.

6. The inertial drive actuator according to claim 5, wherein an optical element is further installed on the moving body via a coupling member.

7. The inertial drive actuator according to claim 5, wherein
   two adsorbing portions are formed to be aligned in a direction in which the moving body moves, and
   the coil is positioned between the two adsorbing portions, and
   an axis of the coil coincides with a direction of movement of the moving body.

8. The inertial drive actuator according to claim 5, wherein
   a protrusion for forming the coil is formed on the adsorbing portion, in a direction perpendicular to a surface facing the vibration substrate.

9. The inertial drive actuator according to claim 8, wherein the protrusion also serves as the coupling member.

10. The inertial drive actuator according to claim 5, wherein at least one of the vibration substrate and the fixed member is made of a magnetic body.

11. The inertial drive actuator according to claim 10, wherein a guide for regulating a direction of movement of the moving body and a movement in a direction perpendicular is formed on the vibration substrate.

12. The inertial drive actuator according to claim 5, wherein a permanent magnet is disposed on a surface of the fixed member not facing the moving body.

13. The inertial drive actuator according to claim 12, wherein a guide which is made of an insulating body for regulating a direction of movement of the moving body and a movement in a direction perpendicular is formed on the fixed member.

14. The inertial drive actuator according to claim 4, wherein an optical element is further installed on the moving body via a coupling member.

15. The inertial drive actuator according to claim 4, wherein
   two adsorbing portions are formed to be aligned in a direction in which the moving body moves, and
   the coil is positioned between the two adsorbing portions, and
   an axis of the coil coincides with a direction of movement of the moving body.

16. The inertial drive actuator according to claim 4, wherein a protrusion for forming the coil is formed on the adsorbing portion, in a direction perpendicular to a surface facing the vibration substrate.

17. The inertial drive actuator according to claim 16, wherein the protrusion also serves as the coupling member.

18. The inertial drive actuator according to claim 4, wherein at least one of the vibration substrate and the fixed member is made of a magnetic body.

19. The inertial drive actuator according to claim 18, wherein a guide for regulating a direction of movement of the moving body and a movement in a direction perpendicular is formed on the vibration substrate.

20. The inertial drive actuator according to claim 4, wherein a permanent magnet is disposed on a surface of the fixed member not facing the moving body.

21. The inertial drive actuator according to claim 20, wherein a guide which is made of an insulating body for regulating a direction of movement of the moving body and a movement in a direction perpendicular is formed on the fixed member.

* * * * *